United States Patent [19] [11] 4,399,178
Barta [45] Aug. 16, 1983

[54] DECALCAMANIA PICTURE FOR APPLYING DESIGNS OR IMPRINTS TO OBJECTS OF GLASS, CERAMICS OR SUCH-LIKE, PROCESS FOR TRANSFERRING DECALCAMANIA PICTURE OF THAT KIND, AND APPARATUS FOR CARRYING OUT SAID PROCESS

[75] Inventor: Franz Barta, Vienna, Austria

[73] Assignee: Franz Barta Kommanditgesellschaft, Vienna, Austria

[21] Appl. No.: 372,402

[22] Filed: Apr. 27, 1982

Related U.S. Application Data

[62] Division of Ser. No. 111,408, Jan. 11, 1980, Pat. No. 4,379,017.

[30] Foreign Application Priority Data

Jan. 12, 1979 [AT] Austria .................................. 248/79

[51] Int. Cl.³ .......................... B32B 3/02; B32B 7/06; B05D 1/32

[52] U.S. Cl. .................................... 428/202; 428/194; 428/195; 428/207; 428/914; 156/238; 156/240; 156/230; 427/282

[58] Field of Search ...................... 428/45, 47, 84, 202, 428/914, 207, 43, 51, 49, 55, 53, 200, 195, 78, 348, 79, 349, 346, 194, 350, 81, 201, 191; 427/282, 259, 149, 272; 101/34; 156/230, 234, 238, 240, 542, 89, 90, 289, 344, 249

[56] References Cited

U.S. PATENT DOCUMENTS

| | | | |
|---|---|---|---|
| 1,903,639 | 4/1933 | Taplin | 156/542 |
| 2,235,514 | 3/1941 | Bown . | |
| 2,424,508 | 7/1947 | Simmonds | 427/149 |
| 3,533,822 | 10/1970 | Bailey . | |
| 3,813,268 | 5/1974 | Kerwin | 156/238 |
| 3,826,650 | 7/1974 | Schlesinger | 428/195 |
| 3,984,273 | 10/1976 | Said | 156/240 |
| 4,024,287 | 5/1977 | Golchert | 156/234 |
| 4,094,716 | 6/1978 | Lopez | 428/914 |

FOREIGN PATENT DOCUMENTS

| | | |
|---|---|---|
| 2141336 | 2/1973 | Fed. Rep. of Germany . |
| 2010470 | 2/1970 | France . |
| 2136509 | 11/1972 | France . |

*Primary Examiner*—Edward C. Kimlin
*Assistant Examiner*—Louis Falasco
*Attorney, Agent, or Firm*—Ladas & Parry

[57] ABSTRACT

A ceramic transfer picture with a water-absorbing separable paper carrier is provided with a screening layer on its surface opposite the image layer. Said screening layer leaves uncovered only the image areas to be moistened; further, a compensating layer of polyglycol or polyethylglycol wax is provided at or in the image layer as well as an organic intermediate layer between the paper carrier and the image layer controlling the plasiticization of the image layer. In order to achieve a fast separation of the images from the paper carrier, steam is raised during the transfer of the decalcamia pictures. Owing to the nonabsorbent screening layer, the paper carrier is strong so that material in rolls may be used in a mechanical transfer. The applicator-apparatus for it has accordingly a transport device with a delivery spool for the lamellar decalcamania picture material and a batching roller for the separated paper carrier, driving, guiding and tension rollers as well as a movable, heatable pressing agent for the objects to be decorated, such as a stamping device, opposite a holder, e.g. a turning table.

15 Claims, 5 Drawing Figures

DECALCAMANIA PICTURE FOR APPLYING DESIGNS OR IMPRINTS TO OBJECTS OF GLASS, CERAMICS OR SUCH-LIKE, PROCESS FOR TRANSFERRING DECALCAMANIA PICTURE OF THAT KIND, AND APPARATUS FOR CARRYING OUT SAID PROCESS

This is a division of application Ser. No. 111,408, filed Jan. 11, 1980, now U.S. Pat. No. 4,379,017.

The invention relates to a decalcamania picture for applying designs or imprints to objects of glass, ceramics or such-like with a vitrifiable color image layer which is coupled to a carrier of paper over an interface to ease its separation. Further, the invention relates to a process for transferring decalcamania pictures of that kind to objects of glass, ceramics or such-like, said decalcamania pictures being applied to the objects while heated and under pressure, and to an apparatus for carrying out said process.

Various decalcamania picture materials as well as transfer methods have already been proposed for the decoration of objects made from glass, ceramics, porcelain, enamel or such-like. In principle, the known decalcamania pictures, also called ceramic transfer pictures, have a print carrier which is separated during the actual transfer of the picture, and a color print representing an image, an imprint or such-like, the color print being in several layers, if necessary. On the side turned toward said color print—further simply called image layer—the print carrier has a coating, the so called interface, easing the separation, said interface, for example, being water-soluble or thermoplastic. The print carrier itself mainly consists of paper, but may also consist of a plastic product, for example, of a siliconized plastic, and on said print carrier the desired image is printed according to the synthesis of the picture or motive in a vitrifiable color or in several vitrifiable colors, and, if necessary, with an upper color-surface layer which forms the color ground of the image after the transfer, especially in a process of screen printing. During the transfer, the image, i.e. the color layer(s), adheres to the object to be decorated and the print carrier is separated, and after said transfer the objects with the transferred images are heated, whereby the ceramic colors are "burned" and vitrify or melt, and the still present adhesive or binding agents burn without leaving residues.

Despite various improvement attempts and modifications, the known ceramic transfer pictures now as before reveal disadvantages which have an effect on the transfer process per se and the quality of the transferred image or imprint. Above all, the known ceramic transfer pictures are not suitable for a mechanical transfer to the objects to be decorated. Fundamentally, depending on the mode of transfer, the known ceramic transfer pictures may be divided into two kinds, into dry hot transferable ceramic transfer pictures (see, for example, Austrian Pat. Nos. 222 140, 225 206, 274 860, German Pat. No. 1 236 995, German Laid Open Specifications Nos. 2 120 129, 1 816 759, 2 750 993, as well as German Pat. No. 1 646 727, U.S. Pat. No. 3,533,822, U.S. Pat. No. 4,068,033), and into wet, i.e. with the help of water and solvents, transferable ceramic transfer pictures (see, for example, German Laid Open Specifications Nos. 2 145 099, 2 141 336, 2 019 748 as well as U.S. Pat. No. 3,533,822); besides, there are also dry separable, cold transferable decalcamania pictures provided with a pressure sensitive permanent adhesive (see, for example, German Pat. No. 1 246 518, German Laid Open Specification No. 902 632), or ceramic transfer pictures provided with an adhesive layer, which ca be activated with a solvent (see, for example, German Laid Open Specification No. 1 571 432). Thereby, depending on the mode of transfer, print carrier materials are used which, for example, consist of paper with an interface of an eventually wax-like material, of polyethylene glycol, polywaxes or polyglycol, as well as plastic foils with a wax coating, siliconized plastics, and also polyethylene or similar plastic products without any interfaces. There have also been proposed decalcamania pictures for which a wax-impermeable barrier layer is provided between the interface of a waxlike material and the paper carrier. The image layer in the known decalcamania pictures usually consists of a binding agent and the desired ceramic pigments. If necessary, a thermoplastic dope is printed on the image layer of the hot transferable decalcamania pictures, or a thermoplastic binder is incorporated in the image layer in order to achieve the adherence of the image to the object to be decorated during heat transfer. The image layer in the wet transferable decalcamania pictures is provided with a gumming layer, a mucilage of gum arabic, which is moistened for the transfer so that the image layer can adhere to the object. During the transfer itself, in the case of heat transfer, the object to be decorated is heated and/or the decalcamania picture is heated from the back side by means of a heated stamping device or such-like, and/or the gum side of the picture sysnthesis is heated before the actual transfer, the adhesive remaining sticky over a specific short period of time; in the case of a wet transfer the image film is activated with water or a solvent so that it becomes sticky without being heated.

In the case of heat transfer it is of particular disadvantage when the object to be decorated is heated, since, on the one hand, it is very difficult to heat the object to a precisely determined, rather narrow temperature range, apart from the fact that high energy losses appear with this procedure and as a result thereof the costs are rather high. Another disadvantage is that heated objects can be badly handled, and that heat-dissipation of different intensity leads to fluctuations in temperature, although narrow temperature ranges must be precisely maintained for a correct heating of the interface and the adhesive layer. Therefore, there is a bad separation of the image layer during the transfer, portions of the picture are torn off and are taken along by the print carrier when being separated, and furthermore, through air pockets during the transfer, incendiary disturbances, i.e. craters and pinholes, are caused, which lower the quality of decoration.

Such quality deteriorations of the transferred image resulting from air pockets are also apparent in the water or solvent activated adhesive layers, whereby it is also disadvantageous that frequently a comparatively long period of time is required for the washing or activation with the solvent prior to the transfer process, and that the image layers easily slip out of position so that an exact positioning of the image onto the object to be decorated is impossible. Besides, the necessity of a solvent also fundamentally increases the cost of the transfer system.

In general it will be noted that the known systems are not suitable for mechanizing the transfer process, since, above all, the separation of the image film and the carrier material requires too long a time. This also concerns systems with a dry separation in which picture portions are easily torn off so that it is necessary to be very careful, and thus, said known systems, apart from having a high error quota, are also considered to be too slow for an industrial mechanization. Even from a merely mechanical function of the transfer process the transfer develops very slowly since until now practically only single image-cuts can be transferred; they are piled and picked up separately by means of a gripping device, especially a suction gripping device, and are transferred to the object to be decorated.

It is the object of the invention to produce an improved decalcamania picture of the kind indicated above, in which the aforementioned disadvantages are avoided, and which is suitable for a fast, industrial and perfect mechanical transfer during which qualitatively first-rate designs or such-like are obtained. It is a further object of the invention to provide a process for transferring said decalcamania pictures to objects to be decorated, and an apparatus for carrying out said process, bringing about an industrial, fast and inexpensive transfer of decalcamania pictures by achieving a good picture quality.

The aforementioned kind of decalcaminia picture according to the invention is characterized in that the lamellar carrier consists of water absorbing paper and that at its surface opposite the image layer it is provided with a layer revealing the areas of design or imprint resulting from the image layer for the penetration of water, but concealing the remaining carrier from moisture, and that preferably a compensating layer is provided, for example, from polyglycol or polyethylglycol wax, which can be activated by heat and/or water, or by a water-solvent combination, and which, therefore, can be substantially converted into a flowable state during the transfer, said compensating layer being connected to the image layer at the side which is not in contact with the carrier, or by being incorporated directly into said image layer through blending.

The process according to the invention for transferring said decalcamania pictures to objects of glass, ceramics or such-like, the decalcamania pictures being applied to the objects while heated and under pressure, is characterized in that the decalcamania pictures are moistened with water or with a water-solvent mixture on the side of the carrier which is not in contact with the image layer, and are transferred to the respective object under the influence of steam and pressure.

Thus, the invention is based on the knowledge that by using pressure and heat in combination with moistening (either with water or with water-solvent mixtures), hence, by using steam, an instant separation of the image layer from the carrier is made possible. At the same time said steam application or steam formation brings about the softening (sintering) of the image layer and the activation of the preferably provided compensating layer, and therewith the adhesion of the image layer on the surface of the object to be decorated is achieved. During the activation the compensating layer is brought into a practically flowable state and prevents the inclusion of air when pressing the image layer against the object. According to the specific requirements and desires, especially to the manner in which the objects are to be decorated, and accordingly to the kind of decalcamania pictures used, the synthesis and the thickness of the compensating layer may be varied. Preferably, the material used for the compensating layer is a polyglycol or polyethyglycol wax which can be activated, whereby said substances are applied by being dissolved in a suitable solvent constituent. Said substances can be activated by heat, water or by a water-solvent combination. Other suitable materials for the compensating layer are reversible thermoplastics such as acryl resins or ethyl cellulose, methyl methacrylate, methyl-n-butylmethacrylate interpolymer, ethylmethacrylate, n-butyl-isobutylmethacrylate interpolymer 50:50 and similar combinations known per se as binding agents for color layers. It is essential that said materials for the compensating layer be brought into a substantially flowable state when being transferred, for example, gushing, so that it is possible to press the image-layer against the object to be decorated without the formation of air bubbles, and that during the burning of the colors they burn without leaving residues, namely, before the frit of the image layer begins to melt, whereby they should not evolve too much gas either. It is expedient if the compensating layer is independent of color.

It must also be mentioned that it is obvious that under the term "image layer" configurations composed of several color layers should be understood.

For the transfer the decalcamania pictures provided for one lamellar carrier can be separately moistened with water or with the respective solvent-water mixture prior to being heated and subjected to pressure, or they may practically simultaneously with the application of pressure be acted upon with water (or the solvent-water mixture) and heat. In the preceding moistening the employed wetting agents or combinations quickly penetrate into the carrier paper, and the moisture soaked in by the paper is promptly evaporated by heating, for example, by means of a customary heated stamping device. Therewith, likewise as in the simultaneous application of water (or the mixture) and heat, an instantaneous separation of the color layer(s), i.e. the image film, from the carrier paper is achieved. Besides, even a small moisture content is enough to enable said instant separation when applying heat.

It is a further advantage of the invention that also when transferring a design or imprint to very curved objects or to very embossed surfaces (for example, relief flags (tiles)), a qualitatively excellent attachment of the design or imprint is possible, since due to moistening the paper of the print carrier, i.e. the carrier paper, becomes well adaptable, and thus when pressure (and heat) is applied, an excellent "adhesion" in the recesses of the object surface to be decorated is made possible, and therewith a good adherence of the image layer. In this connection it is also necessary to mention that according to the German Laid Open Specifications Nos. 1 935 748 and 1 924 764 it has already been tried to achieve an adhesion of decalcamania pictures when being transferred to curved surfaces, but the solution of said problem was only seen in the application of underpressure to suck in the image; this, however, is complicated.

The water absorbing paper, which is provided as a print carrier, is suitably furnished with an interface consisting of a rubber coating, a wax coating, of polyglycols or polyethylene glycols on a water-soluble basis known per se. Since the paper of the carrier should be water-absorbing, that is, it should contain no or a little glue, the wet resistance to tearing of said paper is bad. Because of this, the tearing of a soaked, wet paper would easily be apparent in the mechanized transfer process in which strips are used (which are drawn off from a roll), and when tensions are formed or requisite. The screening layer, which is applied to the back side of the carrier paper and which uncovers only a portion of the carrier paper to be moistened, prevents said complete wetting, and thus the resistance to tearing of the paper is retained. The screening layer can consist of nonabsorbent materials, such as all sorts of paints and lacquers, for example, nitro-combination lacquers, acryl-resin lacquers, PUR (polyurethane) systems and such-like, or of other substances penetrating into the paper fiber and bringing about an impregnation effect. Said materials penetrate or diffuse the paper up to a depth of, for instance, ⅓ to ½ of the paper thickness and bring about a subsequent "impregnation" or partial pasting of the paper at the desired spots. Thereby, in the zone of the image, design, imprint or such-like, corresponding to the contour of the image, i.e. the contour of the color layer, the screening may be completely discontinued, however, for the purpose of additionally increasing the resistance to tearing of the carrier, it may also be given a lattice or grating pattern or be linear in said zone of design or imprint. Further, with respect to a mechanized, fully automatized transfer, it is advantageous if at one edge of the decalcamania picture material being in the form of strips according to the individual image, design or imprint to be transferred, the screening layer is regularly discontinued and provided with control index marks to advance the strip for the mechanical transfer of the images. During the transfer the control index marks can be read in a manner known per se, for instance, optically by means of photo detectors, in order to obtain control signals, for example, start or stop signals for the feeding device of the transfer apparatus.

In order to be able easier to control the plasticization of the image film during the formation of steam, primarily during a uniform application of moisture and heat depending on the kind and composition of the image film, it is further advantageous if between the color layer and the interface attached to the carrier an intermediate layer is provided, consisting, for instance, of ethyl cellulose, methyl methacrylate, methyl-n-butyl methacrylate interpolymer, ethyl methacrylate, n-butyl- isobutyl-methacrylate interpolymer 50:50, with suitable plasticization means, controlling the plasticization of the color layer during the transfer onto the object and burning without leaving residues while the color layer is burning. Therewith the softening of the image layer, which is apparent in consequence of the action of moisture or steam, may be controlled as required by a suitable softness adjustment of said controlling intermediate layer.

An additional activation of the compensating layer, favoring the bubble-free adhesion of the image layer to the object to be decorated, may be attained by slightly pre-heating the object (to an uncritical temperature far beyond the temperatures necessary for the heat transfer in the customary systems), or by wetting it with water or water-solvent components.

The moistening of the carrier paper can, in principle, be carried out, for example, with the help of a dropper which is disposed before the actual transfer station in the direction of movement of the decalcamania picture strip, where the individual images, designs or imprints are transferred to the respective object by means of an easily heated pressure agent. Prior to arriving at the transfer station, the strip may also pass through a bath or such-like and thus be moistened, and it is also possible to act directly with steam upon the strip from the back side in the transfer station itself, by penetrating the pressure agent; however, tests have shown that in the latter case the duration of the strip in the transfer station and therewith the period of time necessary for the transfer is a little longer than in other cases.

Especially suitable for carrying out the transfer process according to the invention is an apparatus which is characterized in that it is provided in a manner known per se with a holder for the objects to be decorated and an easily heated pressure agent, for example, an adjustable stamping device, which is movable relative to said holder, a pressure roller or a wiper as well as with a transport accessory device having a delivery spool, driving or guiding rollers, tension rollers and a batching roller for the strip, and that a moistening arrangement is provided with a fabric or tape put against the back side of the strip passing through a bath or such-like for moistening. With said apparatus an especially short transfer time may be obtained for single images or designs, the quality of the transferred images being excellent.

It will be mentioned that an apparatus for transferring tags, labels or such-like from a strip to objects is known per se from the Austrian Pat. No. 329 458, the strip being drawn off by a delivery spool and guided via guiding rollers and a movably adjusted tension roller in the zone of an adjustable heated stamping device opposite a support or a holder for the respective object. The carrier strip from which the individual images are separated by means of a stamping device; is then guided to a batching roller via a likewise movably arranged tension roller as well as guiding and driving rollers, braking devices for clamping the strip also being provided in the zone of delivery and discharge of the strip. However, as mentioned, this known apparatus is mainly good for the transfer of tags, whereas ceramic transfer pictures have until now usually been transferred with machines whose gripping devices or suction gripping devices transfer the piled individual decalcamania pictures to the transfer zone. Especially since according to the invention the reistance to tearing of the paper carrier is retained or is getting increased as compared to the known systems, goods in rolls can be advantageously worked with according to the invention and accordingly, an apparatus having a wind-off and wind-up roller as well as driving, guiding and tension rollers can be used; further, in the scope of the invention there is provided an arrangement for wetting the decalcamania picture strip and for applying steam thereto. Therewith machine systems of other transfer materials known per se may be adapted with only insignificant modifications for the mechanized transfer of ceramic transfer pictures without, for example, involving high costs.

Hereinafter the invention is further explained by practical examples represented in the drawing, in which in particular:

Figure 1:
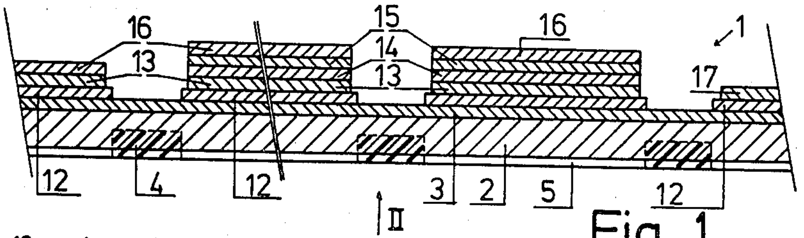
FIG. 1 shows a schematic longitudinal view not in true scale through a strip with different image imprints according to the invention.
Figure 2:
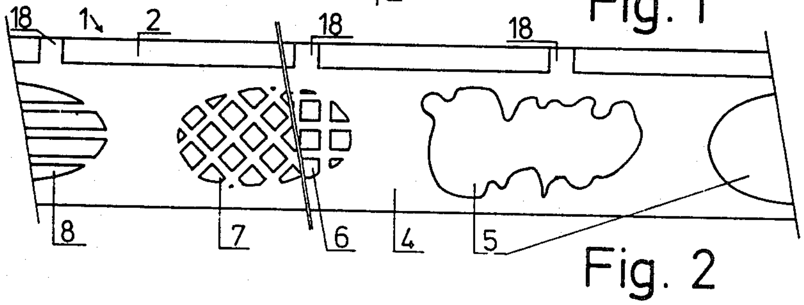
FIG. 2 shows a lower view according to arrow II in FIG. 1 for illustrating the back side, i.e. that of the surface not in contact with the image layer, of the lamellar carrier with the screening layer.

A decalcamania picture strip entirely designated with 1 is schematically illustrated in FIGS. 1 and 2, whereby for the sake of simplification the decalcamania pictures are shown with different image structures one after another in FIG. 1, and in FIG. 2 different developments of the screening layer are shown. It is obvious that in the case of a decalcamania picture of that kind, the image structures or the development of the screening layer are practically uniform.

Figure 3:
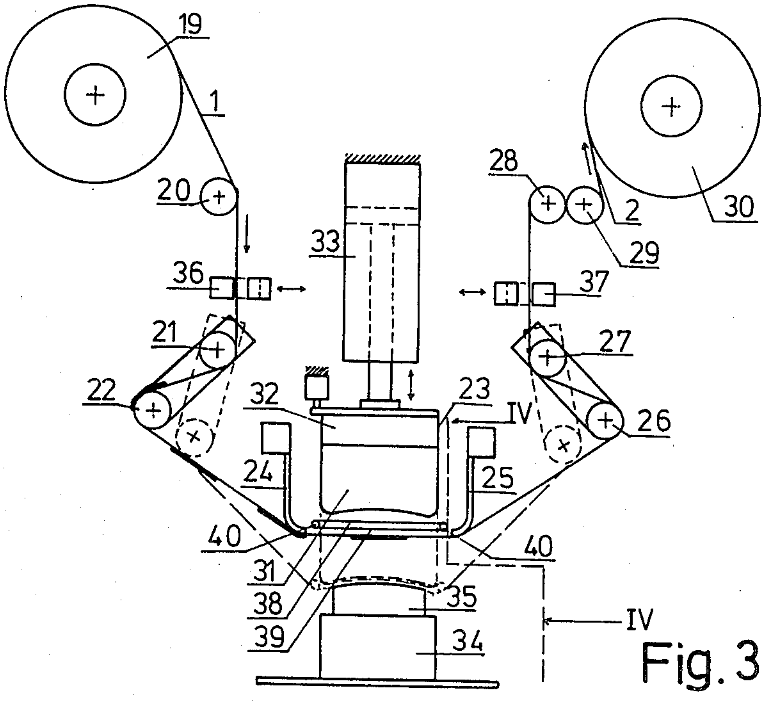
FIG. 3 shows a schematic view of an apparatus for transferring individual images onto objects having, for instance, a curved surface, such as vases, etc., in resting or open position.

The illustrated strip consists of a lamellar print carrier of water-absorbing paper, i.e. not or slightly sized paper (which for the achievement of a fast penetration effect should be or is substantially free of fillers), which at its upper side is provided with an interface 3, for instance, a rubber coating or wax coating, or of a polyglycol or polyethyl glycol on a water-soluble basis. A suitable print carrier material is, for example, the so-called meta-decalcaminia picture paper, or the so-called duplex-paper. Especially suitable as a water-absorbing paper for the print carrier is meta-paper SBII or meta-paper SBIV, or metal-dux paper of the firm Hoffman & Engelmann. In general these papers are water-absorbing, coated paper, the water-absorbing paper carrier being provided with a thin layer of a water-soluble starch or a similarly constituted layer. A layer of a wax-like substance, which can be dissolved or activated with water and heat, is coated over it. The gram weight of such papers is in general 135 $g/m^2$. At the back side or bottom side carrier 2 is provided with a screening layer 4 which substantially covers carrier 2 and thus screens it from being wetted, however, it uncovers the carrier for being moistened (either with water or with water-solvent mixtures) in those areas in which the image films or layers, which are closer illustrated below, are available at the upper side of the layer. Moreover, the screening layer 4 may, for instance, as illustrated in zone 5 of FIG. 2, be completely discontinued, it also may be given a grating or lattice pattern and be provided with suitable perforations, as illustrated in FIG. 3 under 6 or 7, in those zones in which the image layers are available at the opposite side, further shortly called image zones, and the screening layer may also be linear with linear openings as shown under 8 in FIG. 2.

The material of the screening layer 4, especially a paint or a lacquer, such as a nitro-combination lacquer, an acryl-resin lacquer, a polyurethane system or suchlike, penetrates into the paper or print carrier 2 as to be seen from the diagrammatic representation according to FIG. 1, the depth of penetration, for example, being about $\frac{1}{3}$ up to $\frac{1}{2}$ of the total thickness of print carrier 2. In this way it is achieved that an appropriately strong paper fiber layer is made nonabsorbent, and, therefore, the print carrier, which is in the form of a strip or a tape, also becomes sufficiently stable and tension-proof when being moistened (wetted) while drawn during the transfer.

At the upper side of the thus formed print carrier there are provided individual image layers which are usually printed on in layers. According to the motive of the image or imprint as well as because of other contemplations or circumstances, the image layers, also called image films, may be differently composed, however, preferably, they have a lower control-intermediate layer 12, one or several color layers 13, or 13, 14, if necessary with an upper surface layer 15 (which forms the base of the image, for instance, a color ground, after the transfer and which according to the synthesis of the image may be necessary for achieving a sufficient coverage), and a compensating layer 16. Instead of an isolated compensating layer, the color layer or the color and surface layers can be combined with said compensating layer as illustrated in FIG. 1 according to the right image layer near 17, which is a combined simple color and compensating layer above a control-intermediate layer 12. It will be noted that in principle the control-intermediate layer 12 may be omitted, however, it is preferable to provide such an intermediate layer, since therewith, through a suitable softness adjustment of said intermediate layer, the right plasticization of the color layers may be controlled at steam formation, this not being easily possible without such an intermediate layer because the color layers often cannot be widely enough varied in their composition. Thereby the intermediate layer 12 may be especially composed of ethyl cellulose, methyl methacrylate, methyl-n-butyl methacrylate interpolymer, ethyl methacrylate, n-butyl- isobutyl-methacrylate inyerpolymer 50:50 and different plasticization agents known per se suitable thereto. It is important that after the transfer has been carried out, the material of the intermediate layer "evaporates" or burns without leaving residues in order to get a quantitatively perfect decoration during the burning of the vitrifiable colors. In addition to its control functions, it is a further advantage of the intermediate layer 12 that it enables a better adhesion primarily of small image elements, the so-called elements, so that, for instance, image motives with delicate ornaments are possible.

The color layer 13 or color layers 13, 14 are composed of known combinations such as acryl resins, ethyl cellulose, methyl methacrylate, methyl-n-butyl methacrylate interpolymer, ethyl methacrylate, ethyl-n-butyl-isobutyl-methacrylate interpolymer 50:50 as binder, and ceramic pigments of the desired operating ranges and chemical resistance ranges. The protective layer 15, which is provided when a sufficiently opague color ground is desired, may also be composed on the basis of said materials. Said layers may be applied in a customary way, for example, by means of screen printing or another printing process.

The aforementioned materials such as acryl resins, ethyl cellulose, methyl methacrylate, methyl-n-butyl methacrylate interpolymer, ethyl methacrylate, ethyl-n-butyl-isobutyl-methacrylate interpolymer 50:50 may also be used for the composition of the compensating layer. Polyglycols or polyethylene glycol waxes which can be activated are other materials for the compensating layer. Said substances are dissolved in suitable solvent components and applied; they can be activated by heat, water or by water-solvent combinations. During the activation this material softens so that it almost "liquefies"; therewith a bubble-free adherence of the color layer or color layers to the object to be decorated is made possible during the transfer. A mixture of customary ceramic colors and, for instance, suitable polyglycols or polyethylglycol waxes are used in the case of a combined color and compensating layer 17. Here, likewise as in the case of the intermediate layer illustrated above, it is also important that the material of the compensating layer evaporates or burns during the burning, and namely before the ceramic pigments or the so-called frit begins to melt, whereby no formation of bubbles should be apparent, i.e. said materials should not evolve too much gas. It is expedient if the material of the compensating layer is color indifferent, and the compensating layer is applied in a customary way, for instance, also by means of screen printing or another printing process.

As to be seen from FIG. 2, the screening layer 4 does not cover the lamellar paper carrier 2 over its entire width, a narrow margin is uncovered in which according to the individual image zones 5, 6, 7 and 8 lateral prolongations of the screening layer 4 are provided as control index marks 18 at regular intervals. The screening layer 4 has practically another, especially darker coloring then the paper carrier 2 so that the control index marks 18 may be easily read optically and used for controlling the advance of the strip 1 as well as other arrangements or automatic sequences of operations of the respective transfer apparatus. It is an advantage of the illustrated or described embodiment that no additional control index marks must be applied, since the marks 18 are obtained in one working step with applying the screening layer, approximately in one act of printing. However, it is obvious that if desired it is also possible, as known per se, to use other control index marks, such as, perhaps, indents in the strip or such-like.

The material of the screening layer 4 is water-impervious or water-repellent so that the paper of the carrier 2 is protected against being moistened in those areas where it is covered by the screening layer 4. However, in those spots where the screening layer 4 has openings, the paper carrier 2 may be moistened, whereby the water or solvent-water mixture used for moistening also penetrates into the paper a little laterally so that a moistening or wetting of the paper is also apparent in the areas underneath the screening layer 4. For this reason it is not only possible completely to recess the screening layer 4 in the image zones, but also to provide it with a grating or lattice pattern, and if occasion arises also with a linear pattern or openings, as already illustrated above, whereby a satisfactory moistening is achieved. This is also possible due to the fact that the screen-free area at the back side of the strip 1 does not exactly coincide with the image layer at the front or top side with respect to size and/or position.

All sorts of paints and lacquers such as nitro-combination lacquers, acryl-resin lacquers, PUR (polyurethane) systems, etc., or other substances penetrating into the paper fiber and bringing about an impregnation effect may be used as a material for the screening layer 4.

As mentioned before, for the transfer of decalcamania pictures the paper carrier is moistened from the back side, and the respective image is transferred to the object to be decorated by using heat (and therewith steam) and pressure. The moistening may also take place prior to the transfer, for example, by applying a drop of water or the water-solvent mixture, or by joining a wet fabric to the strip, thereafter transferring the decalcamania picture by using heat and pressure. Owing to heating the water or solvent-water mixture evaporates instantly so that a sudden separation of the image from the carrier 2 is made possible. At this procedure the image gets normally "shot off" from the carrier. Simultaneously with said steam formation the color layer(s) softens or soften under control of the intermediate layer 12, and besides, the compensating layer 16 or the compensating material in the combined layer 17 is activated, and a bubble-free adherence, i.e. an adherence without the inclusion of air, is achieved on the surface of the object. Therefore, the subsequent burning proceeds free from interference, without the formation of bubbles and pinholes so that qualitatively excellent designs or such-like are obtained.

The compensating layer, which according to specific requirements may vary in composition and thickness, can be additionally activated by heating the object to be decorated to some extent, or by carrying out a moistening with water or water-solvent components. Thus, the described pre-heating of the object to be decorated is not critical with respect to eventual temperature ranges and takes place especially at such temperatures which are far below the temperatures otherwise required for a heat transfer of known decalcamania pictures.

Figure 4:
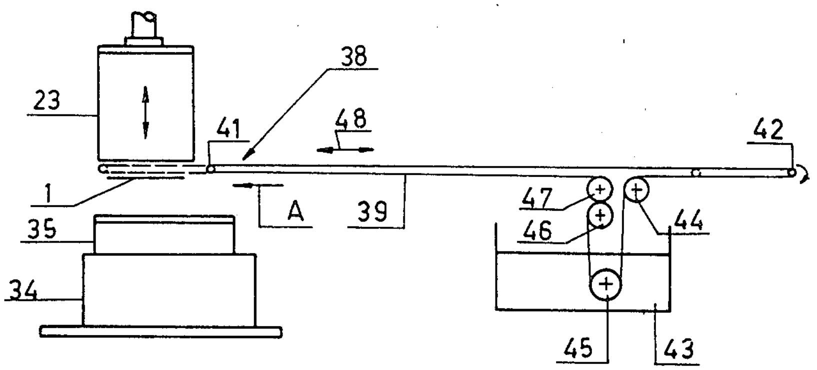
FIG. 4 shows a side view of a member of said apparatus according to line IV—IV in FIG. 3.

In the apparatus according to FIGS. 3 and 4 a decalcamania picture strip 1 is drawn off from a delivery spool 19 and travels therefrom via guiding or driving rollers 20, 21, working without load, to a tension roller 22 which is freely pivoted on, and is movable against a spring tension together with the pivot, for example, by swiveling counterclockwise (see the dotted line in FIG. 3 which corresponds to the working position of the shown apparatus). Then the strip 1 passes a stamping device 23 with guide ways 24, 25, and, thereafter travels via a further tension roller 26 which is movably adjusted similarly to the tension roller 22 and symmetrically thereto, and via a guiding roller 27 to a pair of driving pulleys 28, 29, and finally to a batching roller 30. The stamping device 23, which consists of an exchangeable member 31 being adapted to the form of the objects to be decorated at that time and a permanent base member 32, is movable by means of a known drive, for example, a compressed-air cylinder 33 towards an object carrier or a holder 34 on which an object 35 to be decorated, for example, a vase, a bottle or such-like is placed. As known per se, several holders 34 may be arranged on a turning table, which for the sake of simplification has not been represented in the drawing, said turning table being turned periodically at, for instance, 90°, and being supplied with objects at another place.

The control of the compressed-air cylinder 33 can take place in a manner known per se manually by means of a manually controllable valve or a manually controllable switch with which a circuit for a solenoid valve in the compressed-air line is opened. However, the control can, of course, also take place automatically or semiautomatically, especially by making use of the control index marks 18 described above. While advancing the stamping device 23 and simultaneously holding back the strip, eventually by providing the rollers 19, 30 with braking devices or by activating isolated clamping or braking devices 36, 37, as they are schematically indicated in FIG. 3 and known per se, the stamping device 23 with the guideways 24, 25 takes along the strip 1 together with the decalcamania picture which has been held back in the right position—also under control by means of the control index marks 18—and presses the image film against the object 35, the tension rollers 22, 26 owing to the tension in the strip being swiveled against the spring tension and thereby providing an additional length of the strip, however keeping the strip itself tense. Further, the stamping device 23 is provided with a heating device known per se, for instance, a resistance heating, which is not closer illustrated in the drawing.

In order to moisten the decalcamania picture or the strip 1 during the transfer, a moistening arrangement 38 with a continuous fabric or tape 39 is provided underneath or behind the stamping device 23, said fabric or tape being kept tense in an isolated, perhaps, rectangular frame with thin guide rollers or rods 41, 42 which per se are fastened to the lateral rods or such-like 40 extending transverse to the direction of course of strip 1. To be moistened, the continuous tape or fabric 39 passes through a bath 34 containing water or the desired water-solvent mixture, whereby on forward there are provided guide rollers 44, 45 as well as a pair of squeezing or pressing rollers 46, 47, which enable a good quantity of moisture (water or a water-solvent mixture), which has been absorbed by the tape or fabric 39 and has reached the transfer station underneath the stamping device 23. The frame with the guide rollers or rods 41, 42 is per se or together with rollers 44–47 arranged movably forth and back in the direction of the double arrow 48 (FIG. 4), the front working position in which the front part of the tape of fabric 39 is immediately underneath the stamping device 23 being indicated with dotted lines in FIG. 4. The advance of the frame to the front working position, for example, by means of an electronic sequence control known per se is so controlled relative to the advance of the strip 1 and the working power of the stamping device 23 that at that moment when an image to be transferred has reached the strip 1 in the transfer zone underneath the stamping device 23, the frame with the fabric 39 is moved forward, and immediately thereafter the hot stamping device 23 is directed downward, whereby the wet fabric 39 is pressed against the back side of the strip 1 and its carrier paper is moistened, or, owing to the heat of the stamping device, is acted upon with steam. As already described, this results in a fast and perfect separation of the image layer from the carrier 2, and the image layer adheres to the object 35. Thereafter the stamping device 23 again returns into its upper resting position, and the fabric 39 is also moved back into its back resting position. At the same time, between the individual transfer operations, the fabric is moved or pushed forward, perhaps by means of the driven roller 42 in the direction of arrow A at a distance corresponding to the advance distance of the frame with the fabric, in that case if the frame is moved forward with the rollers 44–47, or at a double advance distance in that case if the frame is moved forward only with the guide rollers 41, 42, so that there is always a fresh, moist segment of the fabric 39 in the lower strand in the front working zone. Such a control for the tape or fabric 39 with the mentioned sequence control for controlling the cylinder motion may be effected with an electrical switching network sufficiently known per se in various embodiments and need not be further explained. Likewise, there is no need for an explanation of the control of the driving pulleys 28, 29 for the intermittent advance of the strip 1, since said control can be effected in different ways sufficiently known per se.

When in operation, for instance, according to the scanning of the control index marks 18, strip 1 is pushed one image forward at any given time, the image arriving under the stamping device 23. Thereafter the fabric 39 is advanced, and the stamping device 23 is moved by the compressed-air cylinder 33 toward the object 35, the image layer being pressed against the object 35, and a moistening and heating (and therewith steam formation) taking place simultaneously. During this simultaneous application of pressure, heat and moisture or steam, the image layer separates from the lamellar layer shortly after, and adheres to the object 35. The stamping device 23 is again moved back into its starting position, whereby due to the action of the tension rollers 22, 26, the strip also moves back (also taking the fabric 39 with it) and is separated from the image layer adhering to the object. Thereafter the fabric 39 is moved back, and the strip 1 is transferred one segment forward, and the described process is repeated.

Owing to the screening layer 4 which permits only a partial moistening of the paper carrier 2, however prevents a complete moistening of the paper, the resistance to tearing of the strip remains sufficiently high in order to hold the tension apparent at advancing and stretching the strip.

The downward motion of the fabric 39 necessarily taking place during the downward motion of the stamping device 23 is, for instance, made possible by the flexibility of the frame, i.e. its rods 40 (which are schematically illustrated in a front view in FIG. 3), or by the ability of the frame to move downward together with the stamping device 23, and, perhaps, by its being fastened to an assembly plate connected to the stamping device. It will also be noted that in FIGS. 3 and 4 the distance between the stamping device 23 and the object 35 is shown unduly large for the sake of a better visualization, and that in practice a relatively short downward motion of the stamping device with the fabric and the strip is sufficient so that the pliable construction or flexibility of the frame is sufficient to enable the downward shifting during the transfer process.

Figure 5:
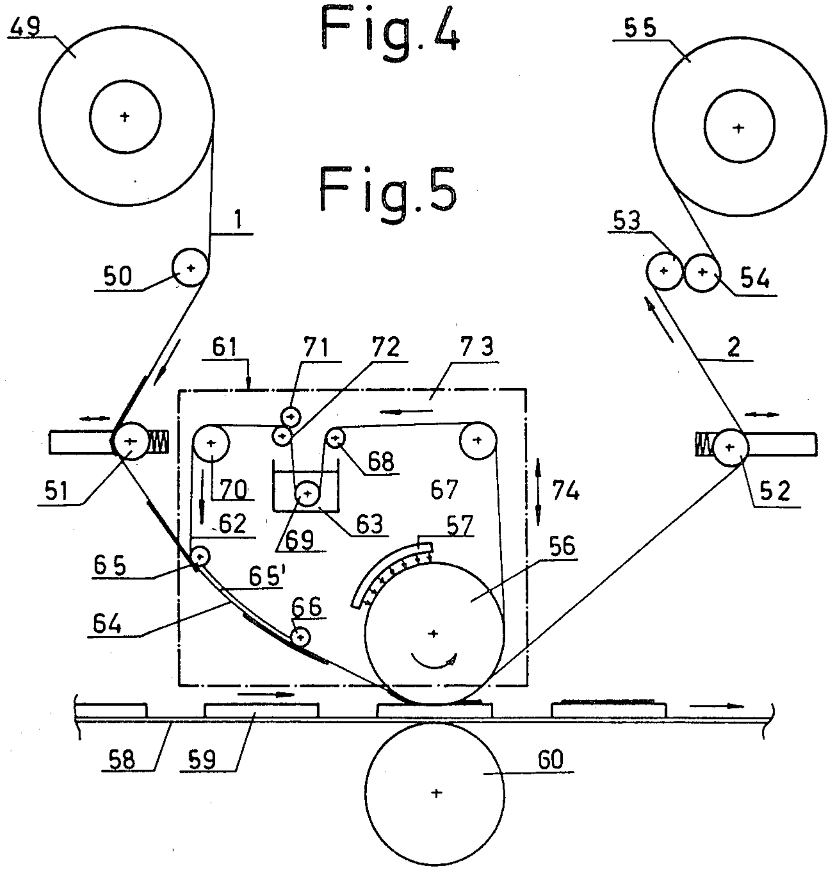
FIG. 5 shows a similar to FIG. 3 schematic view of an apparatus for transferring decalcamania pictures onto flat objects such as tiles.

A slightly modified continuously operating applicator-apparatus is schematically illustrated in FIG. 5, in which a decalcamania picture strip 1 is likewise supplied from a delivery spool 49 via a guide roller 50 and a tension roller 51, which here, for example, is slidably supported with its shaft in a guideway against a spring tension, to the actual transfer station. From said transfer station the permanent strip, i.e. the carrier 2 with the screening layer, arrives at a batching roller 55 by passing a schematically arranged further tension roller 52 and a pair of driving pulleys 53, 54. According to FIG. 5, which is a modification of the apparatus according to FIGS. 3 and 4, the pressing agent is formed by a roller 56, which, for example, may also be flexibly (springy) supported in order to press the continuously moved forward strip against flat objects 59, e.g. tiles, also being continuously advanced on a conveyer belt or such-like 58. Besides, in the zone of the transfer station the conveyer belt 58 is supported by a counter-roller 60. A synchronous advance of the strip 1 with the image films and the objects to be decorated, e.g. tiles, is required according to said apparatus. Of course, it is also possible periodically to advance the tiles 59 and the strip 1 until they reach the pressure roller 56, and then move them together under said pressure roller through it. In a synchronous, equally fast advance of the decalcamania pictures and the tiles it is usually necessary that the pictures or tiles are available at regular intervals. On the other hand, a heating installation known per se, perhaps a heat emitter 57 is assigned to the pressure roller 56 in order to heat the pressure roller 56, and to heat the decalcamania picture during their transfer. Simultaneously with said heating, water or a water-solvent mixture previously applied to the back side of the decalcamania picture strip is evaporated, this having already been closer decribed above. To apply the water or the water-solvent mixture a moistening device 61 is provided with an endless fabric or tape 62 moving together with the strip 1 via the pressure roller 56, said fabric or tape passing through a tub or a bath 63 containing the water or the desired water-solvent mixture for being moistened. In the area of a pre-moistening zone 64, between the rollers 65, 66, the strip 1 and the moistened fabric or tape 62 move together, for instance, via a slightly curved guide surface 65', whereby the water or the water-solvent mixture can penetrate into the paper carrier from the back side of the strip as described above. Instead of the curved guide surface 65, there could, of course, be provided a simple roller via which the fabric 62 and the strip 1 pass with a looping angle of less than 180°.

Owing to the hot pressure roller 56, the water or the water-solvent mixture instantly evaporates from the paper of the carrier 2 in the actual transfer station or zone, this resulting in a perfect separation of the image layer from the carrier 2, and in an adhesion to the respective object 59.

The pressure roller 56 consists, for instance, of copper, nickel or stainless steel, or there is provided a casing made from one of said metals.

The fabric or tape 62 travels via the rollers 65, 66 and the pressure roller 56, and further via the guide rollers 67, 68, 69, 70 and 72, whereby a pressing out or squeezing out roller 71 to dose the moisture of the tape 62 is assigned to the guide roller 27. All rollers 65 to 72, including the pressure roller 56, are preferably fixed to a support plate 73, which is schematically illustrated with dotted lines in FIG. 5, said support plate being movable forth and back between an upper resting position and a lower working position according to the double arrow 74, perhaps by means of a compressed-air or hydraulic cylinder not represented in the drawing.

According to a modification of the described apparatus it is also possible to employ as a pressure agent an easily heated wiper with a rounded off edge, this being especially advantageous if the objects to be decorated have more profilated surfaces, i.e. a stronger embossment, since then an additionally improved sticking (clinging) or adhesion of the image film is made possible.

Furthermore, in the apparatus according to FIG. 5 there may also be provided a customary turning table or such like instead of the conveyer belt 58, one place of the turning table being continuously supplied with the objects to be decorated, and the objects provided with the image layers being taken off in another place so that a continuous process is also made possible.

Of course, in principle it is also possible to provide such a moistening arrangement in the apparatus according to FIG. 5 as in that according to FIGS. 3 and 4 (and vice versa). In the apparatus according to FIG. 5 there are, of course, also provided customary control devices to achieve an automatic or semi-automatic operation of the apparatus, whereby said control devices are sufficiently known and need not be closer explained.

If above the invention has been described by means of preferable practical examples, most various modifications are certainly also possible in the scope of the invention. Thus, it is, for example, also possible to make the decalcamania pictures shortly pass through a bath or such-like for being moistened, or to pre-moisten the strip by means of a dropper arranged in front of the pressure agent and known per se.

I claim:

1. A decalcamania picture for transferring under the influence of moisture a design or image to glass- or ceramics-type material, which comprises a water-absorbing carrier paper having on one surface a vitrifiable color image layer not extending over the entirety of the paper and an interface layer between said image layer and said paper to ease separation thereof, and on its other surface a substantially water impervious screening layer which is intact only in those areas corresponding to those where no color image is present on the opposite side of the paper.

2. A decalcamania picture according to claim 1, wherein the screening layer is absent from the areas corresponding with those having a color image layer on the opposite surface of the paper.

3. A decalcamania picture according to claim 1, wherein the screening layer is intermittently present in areas corresponding with those having a color image layer on the opposite surface of the paper.

4. A decalcamania picture according to claim 3, wherein said screening layer is present in the form of a lattice, grating or lines on at least some of those areas corresponding with those having a color image on the opposite side of the paper.

5. A decalcamania picture according to claim 1, wherein a further layer of a material which can be converted into a flowable state by heat or moisture is superimposed on said color image layer.

6. A decalcamania picture according to claim 5, wherein said further layer is composed of a polyglycol or polyethyl glycol wax.

7. A decalcamania picture according to claim 4, wherein a further layer of material which can be converted into a flowable state by heat or moisture is superimposed on said color image layer.

8. A decalcamania picture according to claim 7, wherein said further layer is composed of a polyglycol or a polyethyl glycol wax.

9. A decalcamania picture according to claim 1, wherein there is provided between said color image layer and said interface layer an intermediate layer to control plasticization of the image layer during transfer onto an object, said intermediate layer being composed of a material which will burn without leaving a residue during burning of the image.

10. A decalcaminia picture according to claim 4, wherein there is provided between said color image layer and said interface layer an intermediate layer to control plasticization of the image layer during transfer onto an object, said intermediate layer being composed of a material which will burn without leaving a residue during burning of the image.

11. A decalcamania picture according to claim 7, wherein there is provided between said color image layer and said interface layer an intermediate layer to control plasticization of the image layer during transfer to an object, said intermediate layer being composed of a material which will burn without leaving a residue during burning of the image.

12. A decalcamania picture according to any one of claims 1 to 11, wherein said screening layer is composed of a nitro-combination lacquer or an acryl-resin lacquer.

13. A decalcamania picture according to any one of claims 1 to 11, wherein the material of said screening layer has penetrated the paper a distance of up to one-half its total thickness.

14. A decalcaminia picture according to any one of claims 1 to 11, wherein said screening layer is composed of a nitro-combination lacquer or an acryl-resin lacquer and penetrates the paper a distance of up to one-half of its total thickness.

15. A decalcamania picture according to claim 1, wherein the screening layer is regularly discontinued at one edge thereof and provided with control marks to mark individual images, designs or imprints.

* * * * *